United States Patent [19]

Amort et al.

[11] 4,028,343
[45] June 7, 1977

[54] ORGANOFUNCTIONAL SILICON COMPOUNDS AS ADHESIVIZERS FOR ORGANIC BINDING AGENTS

[75] Inventors: Jurgen Amort, Troisdorf, Sieglar; Heinz Nestler, Troisdorf, Eschmar, Germany

[73] Assignee: Dynamit Nobel Aktiengesellschaft, Troisdorf, Germany

[22] Filed: Apr. 28, 1975

[21] Appl. No.: 572,585

[30] Foreign Application Priority Data

Apr. 30, 1974 Germany .................... 2420851

[52] U.S. Cl. .................... 260/59 R; 260/2 EP; 260/77.5 R; 260/251 R; 260/309.6
[51] Int. Cl.² .................. C07D 233/04; C08G 2/28; C08G 18/00; C08G 59/00
[58] Field of Search ............ 260/59 R, 309.6, 2 EP, 260/77.5 R, 251 R

[56] References Cited

UNITED STATES PATENTS

| 3,290,165 | 12/1966 | Iannicelli | 106/308 Q |
|---|---|---|---|
| 3,373,137 | 3/1968 | Saam | 260/309.6 |
| 3,847,860 | 11/1974 | Seiler et al. | 260/38 |

Primary Examiner—Melvin I. Marquis
Assistant Examiner—H. H. Fletcher
Attorney, Agent, or Firm—Burgess, Dinklage & Sprung

[57] ABSTRACT

A nitrogen group containing silane of the formula

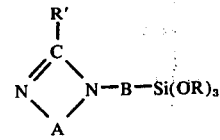

where R is a $C_1$–$C_4$ alkyl group which can contain an oxygen or sulfur atom in the chain, R' is a $C_{1-4}$ alkyl radical or hydrogen, A is a bivalent, saturated, branched or unbranched hydrocarbon radical having 2 to 4 carbon atoms in the chain and B is a bivalent, saturated, branched or unbranched hydrocarbon radical having 1 to 10 carbon atoms in the chain; the use of such compounds in an adhesive composition containing an organic polyaddition or polycondensation polymer as an adhesivizing agent.

14 Claims, No Drawings

ORGANOFUNCTIONAL SILICON COMPOUNDS AS ADHESIVIZERS FOR ORGANIC BINDING AGENTS

BACKGROUND OF THE INVENTION
1. Field of the Invention

This invention relates to new adhesivizing agents for organic binding agents. This invention particularly relates to new nitrogen group containing silanes and their use as adhesivizing agents for organic binding agents employed to bond inorganic oxidic or metallic substances together. This invention relates to such adhesivizing compositions,

2. DISCUSSION OF THE PRIOR ART

Condensation resins of the phenolformaldehyde and amine resin type have long been used as binding agents for industrial purposes, in foundry operation, for example. They are used both in the form of aqueous solutions and in liquid form, or dissolved in organic solvents.

It has now been found that these binding agents have deficient binding characteristics when the bonded materials are exposed to moisture, as they are, for example, in the case of foundry cores and molds. It has been found that the mechanical strength of the bonded materials is lowered after they have been stored under moist conditions.

It has heretofore been proposed to solve this problem by the addition of γ-aminopropyltriethoxysilane and related silanes. This silane is added to the resin component. The addition of such an organofunctional silane has proven useful in improving the bonding characteristics of organofunctional resins under moist conditions, particularly in improving the bonding characteristics of adhesives containing furan resins. Experience, however, has shown that the initial positive effect obtained by the addition of the silane is diminshed after the resinous bonding composition containing silane has been in contact with moisture for a long period of time. In fact, the addition of the aminosilane is inoperative in respect of a number of resins other than furan resins after relatively long storage time, for example, in phenolic resins or epoxy resins. This is probably to be attributed to a reaction between the silane and the resin component itself.

It, therefore, has become desirable to improve the bonding characteristics of polyaddition or polycondensation resinous-containing binding materials so that they have improved bonding characteristics under moist conditions and attain their bonding characteristics even after long storage times. It has become particularly desirable to provide an improved binding composition which has an excellent storage life and retains its ability to improve the bonding characteristics of polyaddition or polycondensation resinous binders. It has become particularly desirable to provide such an improved binder containing a silane.

SUMMARY OF THE INVENTION

The long felt desideratum in the art is satisfied by a nitrogen containing silane of the formula:

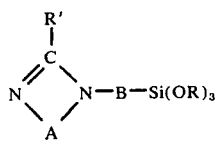

wherein R is a $C_1$–$C_4$ alkyl radical which can contain an oxygen or sulfur atom in the chain, R' is a $C_1$–$C_4$ alkyl radical or hydrogen, A is a bivalent, saturated, branched or unbranched hydrocarbon radical having 2 to 4 carbon atoms in the chain, and B represents a bivalent, saturated, branched or unbranched hydrocarbon radical having 1 to 10 carbon atoms in the chain.

These new silanes have proven to be particularly effective in improving the adhesion between inorganic oxidic surfaces and an organic polyaddition or polycondensation resinous composition. The silanes are generally prepared by contacting an orthocarboxylic acid ester with an N-aminoalkylaminoalkyltrialkoxysilane where the alkyl group of the alkoxy radical has 1–4 carbon atoms at a temperature of at least 150° C.

When recovered the new silane can be included in a polyaddition or polycondensation polymer in an amount amounting up to from 0.05 to 5 weight percent thereof. The silane is used as an additive to binding agents composed of polycondensation products such as phenol-formaldehyde and furan resins, amino plastics or polyaddition polymers. Examples of such polyaddition products known to be used as binding agents are epoxy resins, urethane resins and polyester resins. The polycondensation products includes cold-setting and/or thermosetting phenol-formaldehyde resins. The silanes of this invention can be used to improve the bonding characteristics of all of such materials.

The inorganic surfaces which are bonded by the resins modified pursuant to the invention include, among others, glass, quartz, diatomaceous earth, sand, asbestos, mica, corundum, iron oxides, calcium carbonate, calcium silicate, or mixtures of such substances.

DESCRIPTION OF PREFERRED EMBODIMENTS

Generally speaking, the silanes are prepared by reaction of orthocarboxylic acid esters, such as, for example, orthoformic acid triethylester, with N-aminoalkyl-aminoalkyltrialkoxysilane at elevated temperature, preferaby at temperatures above 150° C. The preparation of these silanes is described in copending application ser. No. 555,324, filed Mar. 4, 1975, and now abandoned.

Particularly contemplated organofunctional silanes of this invention are those having a nitrogen-containing ring set forth below:

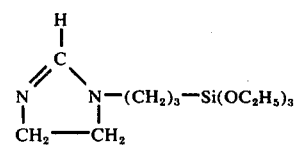

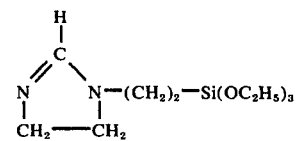

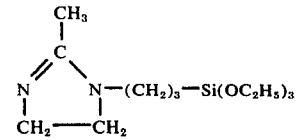

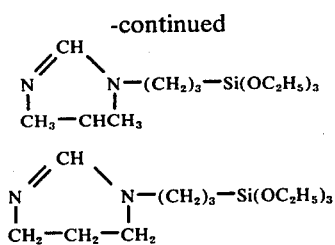

After prepared, the organofunctional silane is incorporated into the binder, it being sufficient that the same be mixed with the resin by known methods until a uniform distribution is achieved. Mixing the resins with the silanes having a nitrogen-containing ring presents an additional advantage of this invention over known resin-silane mixtures. The shelf life of these mixtures, especially when the resin is a phenolic resol resin, is significantly better than in the case of comparable resins with which silane-containing amino groups are mixed.

In order to more fully illustrate the nature of the invention and the manner of practicing the same the following examples are presented:

EXAMPLES

Example 1

Cold-setting phenolic resol resin as binding agent.

1,000 weight parts of Haltern sand H-32 were mixed thoroughly with 25 parts of phenolic resol resin T 77 P (made and sold by Dynamit Nobel AG, Troisdorf, Germany), to which 0.3 weight percent of adhesivizing agent was added, and 16 volume percent (with respect to the resin) of a hardener consisting of a 60% aqueous solution of p-toluenesulfonic acid.

The mixture was placed in a +GF+ test rod mold and compressed by three ramming strokes of +GF+ ramming apparatus. Then the rods were hardened at room temperature, an initial bending strength being measured on half of the rods after 5 hours by means of the +GF+ strength testing apparatus. The second half of the rods were stored for 24 hours in a saturated water vapor atmosphere and then subjected to the bending test.

In a second and third test using the same resin containing an addition of 0.3% silane, the resin was stored for 4 and 7 weeks and then bending test specimens were prepared and tested by the method described above. For comparison, to demonstrate the state of the art, a test was performed with γ-aminopropyltriethoxysilane.

Bending Strength of Test Rods in kg per cm²

| Resin Component + Silane | After 5 h | After 5 h + 24 h of moist storage |
|---|---|---|
| T 77 P without silane | 26 to 30 | 12 to 14 |
| T 77 P with 0.3% γ-aminopropyl-triethoxysilane | 32 to 35 | 24 to 26 |
| T 77 P with 0.3% of 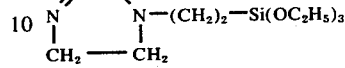 (imidazolinesilane) | 32 to 35 | 20 to 24 |
| Test after resin mixtures had been stored for four weeks: | | |
| T 77 P without silane | 26 to 30 | 6 to 10 |
| T 77 P plus 0.3% of γ-amino-propltriethoxysilane | 26 to 30 | 6 to 10 |
| T 77 P plus 0.3% of imidazolinesilane | 28 to 34 | 20 to 22 |
| Test after resin mixtures had been stored for seven weeks: | | |
| T 77 P without silane | 24 to 28 | 6 to 10 |
| T 77 P plus 0.3% of γ-amino-propyltriethoxysilane | 24 to 28 | 6 to 10 |
| T 77 P plus 0.3% imidazolinesilane | 28 to 32 | 22 to 24 |

Example 2

- Cold-Box Process

A mixture of 100 g of Haltern sand H 32 and 20 g of a polyurethane resin (polyol + isocyanate in a 1:1 ratio), to which 0.3% silane had been added, were mixed thoroughly together and compressed in a +GF+ mold by three strokes of the ram in the +GF+ ramming apparatus. Over a period of 4 minutes, 0.5 ml. of triethylamine was forced through the test specimens by means of a nitrogen carrier stream for the purpose of hardening them. One portion of the test specimens was tested for bending strength in the +GF+ bending test apparatus after 3 hours of storage in the laboratory, and the other part was tested after an additional 24 hours of storage in a saturated water vapor atmosphere.

A comparative test was performed with γ-aminopropyltriethoxysilane.

Then the resin mixtures with and without silane were stored for 13 weeks. Test bodies were again prepared from these resins and were exposed to a moist atmosphere for 24 hours.

Resin Mixtures

I Polyol + isocyanate, 1:1, without silane
II Polyol + isocyante, isocyanate, with 0.5% γ-aminopropyltriethoxysilane.
III Polyol + isocyanate, 1:1, with 0.5% of:

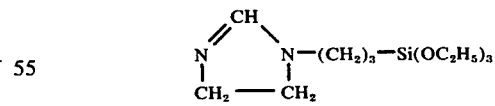

The imidazoline silane was used in the acetate form, because this improved compatibility with the resin in longterm storage.

Results

| Resin Mixture | Bending strength of test specimens in kp/cm² after | | |
|---|---|---|---|
| | 3 hours | 3 hours + 24 h moist storage | 6 weeks of resin storage, then 3 h + 24 h moist storage | 13 weeks of resin storage, then 3 h + 24 h moist storage |
| I | 40 to 44 | 10 to 15 | 5 to 10 | 8 to 12 |
| II | 40 to 44 | 34 to 38 | 8 to 12 | |

Results-continued

| Resin Mixture | Bending strength of test specimens in kp/cm² after | | | |
|---|---|---|---|---|
| | 3 hours | 3 hours + 24 h moist storage | 6 weeks of resin storage, then 3 h + 24 h moist storage | 13 weeks of resin storage, then 3 h + 24 h moist storage |
| III | 40 to 44 | 34 to 38 | 20 to 25 | 25 to 30 |

Example 3

Untreated, water-sized glass fibers were embedded in an epoxy resin to which 0.5% of an imidazoline-group-containing silane of the formula:

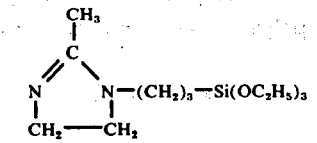

had been added, and the mixture was made into round rods. Setting was performed at 130° C. The glass content of the test rods was 40 to 45%. The dry bending strength was 9,000 kp/cm², and the wet strength after moist storage amounted to 6,800 kp/cm².

When no special silane was added to the resin, a strength of 8,500 to 9,000 kp/cm ² could be obtained before moist storage, and approximately 3,800 kg/cm² after moist storage.

What is claimed is:

1. In an adhesive composition comprising an organic polyaddition or polycondensation polymer and an adhesivizing silane, the improvement where said silane has the general formula:

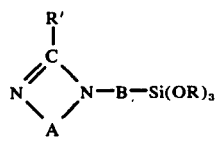

wherein R is a $C_1$–$_{C4}$ alkyl radical which can contain oxygen or sulfur atom in the chain, R' is a $C_{1-4}$ alkyl radical or hydrogen, A is a bivalent, saturated, branched or unbranched hydrocarbon radical having 2 to 4 carbon atoms in the chain and B is a bivalent, saturated, branched or unbranched hydrocarbon radical having 1 to 10 carbon atoms in the chain, said silane being present in said compositiom in an amount of 0.5 to 5 weight percent.

2. An adhesive composition according to claim 1 wherein said silane has the formula:

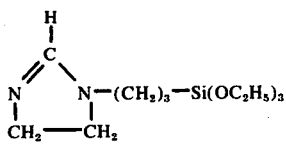

3. An adhesive composition according to claim 1 wherein said silane has the formula:

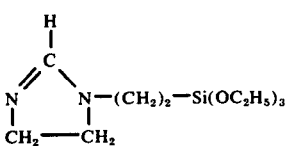

4. An adhesive composition according to claim 1 wherein said silane has the formula:

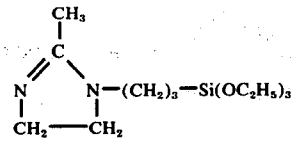

5. An adhesive composition according to claim 1 wherein said silane has the formula:

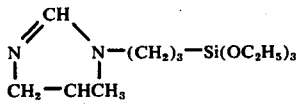

6. An adhesive composition according to claim 1 wherein said polyaddition or polycondensation polymer is a phenolic resol resin.

7. An adhesive composition essentially of an organic polyaddition or polycondensation polymer and an adhesivizing silane having the formula:

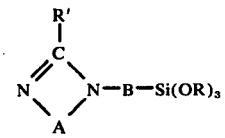

wherein R is a $C_1$–$_{C4}$ alkyl radical which can contain oxygen of sulfur atom in the chain, R' is a $C_{1-4}$ alkyl radical of hydrogen, A is a bivalent, saturated, branched or unbranched hydrocarbon radical having 2 to 4 carbon atoms in the chain and B is a bivalent, saturated, branched or unbranched hydrocarbon radical having 1 to 10 carbon atoms in the chain, said silane being present in said composition in an amount of 0.05 to 5 weight percent.

8. A composition according to claim 7 wherein the silane has the formula:

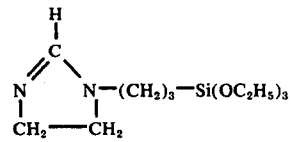

9. An adhesive composition according to claim 7 wherein the silane has the formula:

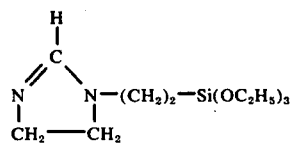

10. An adhesive composition according to claim 7 wherein the silane has the formula:

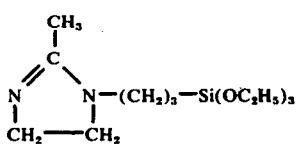

11. An adhesive composition according to claim 7 wherein the silane has the formula:

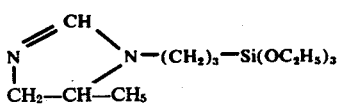

12. An adhesive composition according to claim 1 wherein said silane has the formula:

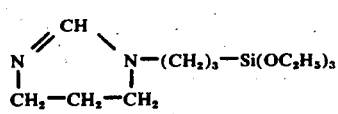

13. An adhesive composition according to claim 1 wherein said polyaddition or polycondensation polymer is a polyurethane.

14. An adhesive composition according to claim 1 wherein said polyaddition or polycondensation is an epoxy resin.

* * * * *

UNITED STATES PATENT AND TRADEMARK OFFICE
CERTIFICATE OF CORRECTION

PATENT NO. : 4,028,343

DATED : June 7, 1977

INVENTOR(S) : Amort et al.

It is certified that error appears in the above-identified patent and that said Letters Patent are hereby corrected as shown below:

Column 2, line 1, "$C_1-c_4$" should read -- $C_1-C_4$ --.

Column 2, line 2, "$C_1-c_4$" should read -- $C_1-C_4$ --.

Column 2, line 27, "includes" should read -- include --.

Column 3, line 5, "$CH_3-$" should read -- $CH_2$ --.

Column 4, line 49, "isocyante" first occurrence should read -- isocynate --.

Column 4, line 49, "isocyanate" second occurrence should read -- 1:1 --.

Column 4, in the Table entitled "Results", the last line in the 5th column across, insert -- 8 to 12 --.

Column 5, line 33, "where" should read -- wherein --.

Column 5, line 42, "$C_1-c_4$" should read -- $C_1-C_4$ --.

Column 6, line 27, "$CHCH_3$" should read -- $CH-CH_3$ --.

Column 6, line 42, "$C_1-c_4$" should read -- $C_1-C_4$ --.

UNITED STATES PATENT AND TRADEMARK OFFICE
CERTIFICATE OF CORRECTION

PATENT NO. : 4,028,343
DATED : June 7, 1977
INVENTOR(S) : Amort et al

It is certified that error appears in the above-identified patent and that said Letters Patent are hereby corrected as shown below:

Column 8, line 15, insert -- polymer -- after "polycondensation".

Signed and Sealed this

Twenty-third Day of January 1979

[SEAL]

Attest:

RUTH C. MASON
Attesting Officer

DONALD W. BANNER
Commissioner of Patents and Trademarks